Aug. 31, 1943.    J. B. DICKSON    2,328,329
LENS
Filed June 17, 1941    4 Sheets-Sheet 1

INVENTOR
JOHN B. DICKSON
BY
ATTORNEYS.

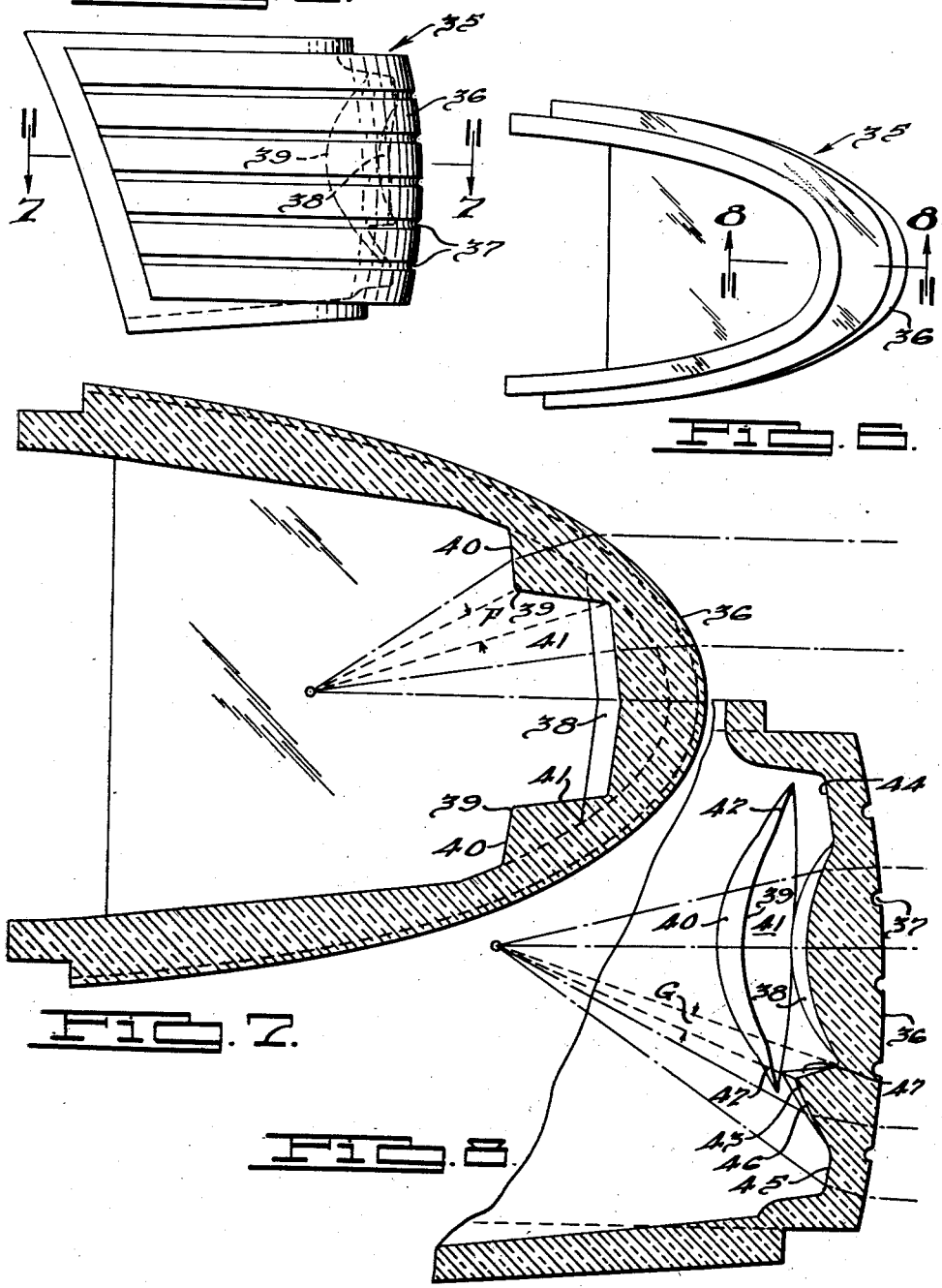

Aug. 31, 1943.  J. B. DICKSON  2,328,329
LENS
Filed June 17, 1941   4 Sheets-Sheet 3

INVENTOR
JOHN B. DICKSON
BY
ATTORNEYS.

Aug. 31, 1943.     J. B. DICKSON     2,328,329
LENS
Filed June 17, 1941     4 Sheets-Sheet 4

INVENTOR
JOHN B. DICKSON
BY
Harness, Dind, Patee & Harris.
ATTORNEYS.

Patented Aug. 31, 1943

2,328,329

UNITED STATES PATENT OFFICE 2,328,329

LENS

John B. Dickson, Highland Park, Mich., assignor to Chrysler Corporation, Highland Park, Mich., a corporation of Delaware Application June 17, 1941, Serial No. 398,439

9 Claims. (Cl. 240—106.1)

The present invention relates to a lens of particular utility for stop lights, directional signal lights, parking lights, or other automobile accessory lights, although the invention may be utilized in any field wherein lenses may be of use. The lens is characterized by having an outer configuration dictated by aesthetic considerations so that the body of the lens may be asymmetrical with respect to its focal axis. This is particularly true in modern automobile manufacturing, since it is now accepted practice to design accessory lenses so as to carry out some artistic theme, thus presenting unusual shapes which the engineering staff must internally design to cause the lenses to perform the light directing functions considered desirable. A further problem thus created is encountered in the manufacture of lenses since modern glass or plastic molding processes tend to dictate the angular characteristics of prisms or other internal shapes which the engineers may use to cause the lenses to have the desired light transmitting characteristics.

An object of the present invention is to form a lens having an outer surface of substantially any artistic shape with inwardly extending ridges or other configurations whereby a substantially large area of the lens projected upon a plane normal to the focal axis of the lens collimates light about the focal axis of the lens.

It is well known in the art that a lens employing a central bull's-eye lens, or other central condensing surfaces, may be surrounded by dioptric or catadioptric lens formations whereby the collimating portion of a large lens may be extended beyond the simple angle to which the condensing portion may extend. However, such lenses are of symmetrical shape with respect to the focal axis of the lens, and it has heretofore been thought impossible to apply the theories thereof to lenses of unusual or asymmetrical shape. An object of the present invention is to provide means or a teaching whereby the major proportion of any lens may be utilized for light collimating purposes.

A further object of the present invention is to so form lenses of asymmetrical shape having the foregoing characteristics that the same may be manufactured by die pressing methods of molding glass or other plastics.

A further object of the present invention is to provide lenses having the foregoing characteristics which may be formed by pressing dies including a male die having a surface configuration such as to form the desired ridges or other surfaces, which male die may be formed by ordinary shaping tools in the hands of relatively unskilled mechanics.

These and other objects and advantages of the present invention will be more readily apparent from a study of the following specification taken in connection with the accompanying drawings wherein like numerals refer to like parts throughout.

In the accompanying drawings, there are disclosed several modifications of the invention as follows:

Fig. 5 is a side elevation of a modified form of lens with the present invention applied thereto.

Fig. 6 is a plan view of the form of lens shown in Fig. 5.

Fig. 7 is a horizontal section taken through the focal axis and substantially along line 7—7 of Fig. 5.

Fig. 8 is a vertical section taken through the focal axis and substantially along line 8—8 of Fig. 6.

Figures 1, 2:
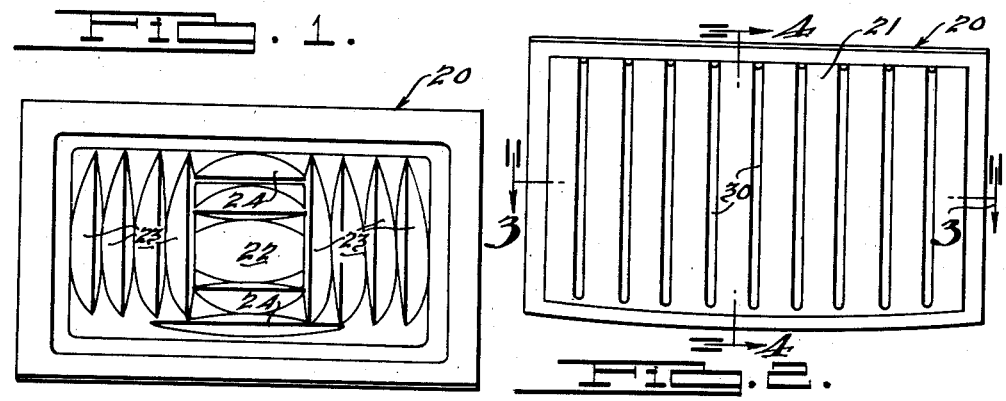
Fig. 1 is a rear elevation of a modification of the invention showing the application of the present invention to a lens of substantially rectangular shape in projection along the focal axis thereof.
Fig. 2 is a front elevation of the lens disclosed in Fig. 1.

Four forms of lenses embodying the present invention are thus illustrated in the drawings, but it is to be appreciated that the forms shown are illustrative of a wide variety of lenses which may have the present invention applied thereto.

Referring particularly to Figs. 1 to 4, inclusive, there is disclosed a lens 20 of substantially rectangular outline when viewed along the focal axis, the lateral dimensions thereof being greater than the vertical dimensions thereof. The lens comprises a body portion of asymmetrical shape with respect to the focal axis and having an outer surface 21 which is substantially smooth but shaped to carry out the desires of the designer or artist. The inner surface of the lens is provided with a central surface 22 arranged in dioptric agreement with the outer surface so as to provide a bull's-eye condensing portion. In order to extend the area of the lens which directs light along the focal axis, I provide a plurality of ridges adjacent the central section 22. Thus, I provide a plurality of vertically extending, substantially straight and parallel ridges 23 at each side of the central section, and a plurality of horizontally extending, substantially straight and parallel ridges 24 above and below the central section 22. The ridges 23 and the lowermost ridge 24 appearing in Fig. 4 have inwardly bowed or longitudinally convexed vertices, shown in Figs. 3 and 4, from which diverge opposite side faces. All portions of these ridge side faces toward the optical axis of the lens are adapted to receive light rays from the focus S. As illustrated at the right in Fig. 3, such light rays are reflected by the opposite ridge faces and are passed through the lens in a course such that they are collimated by the portions of the lens of unalterable contour through which they pass and which register with these ridges. All but the lowermost of the ridges 24 shown in Fig. 3 have vertices bowed inwardly of the lens from which diverge opposite side faces. All portions of these ridge side faces remote from the optical axis of the lens are adapted to receive light rays from the focus S and to direct such light rays through the lens in a course such that they are collimated by the portion of the surface of the lens of unalterable contour through which they pass and with which these ridges register.

Figure 3:
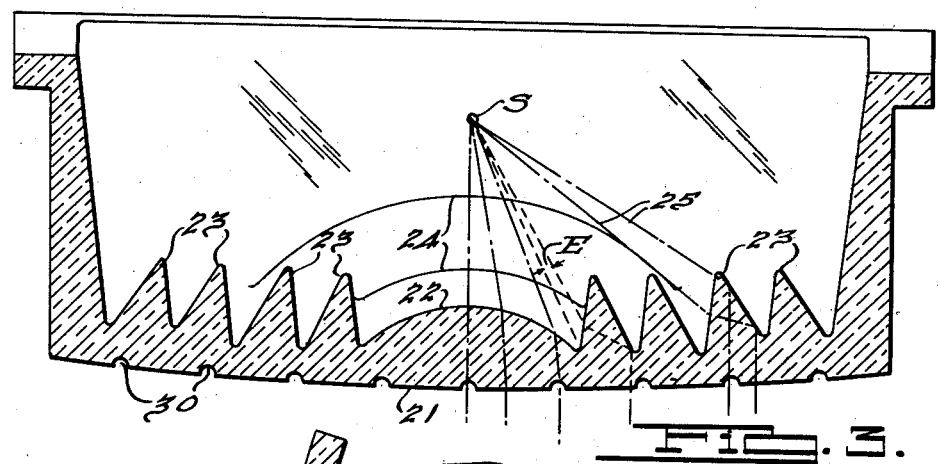
Fig. 3 is a horizontal section taken substantially along line 3—3 of Fig. 2, the plane of the section extending through the focal axis of the lens.
Figure 4:
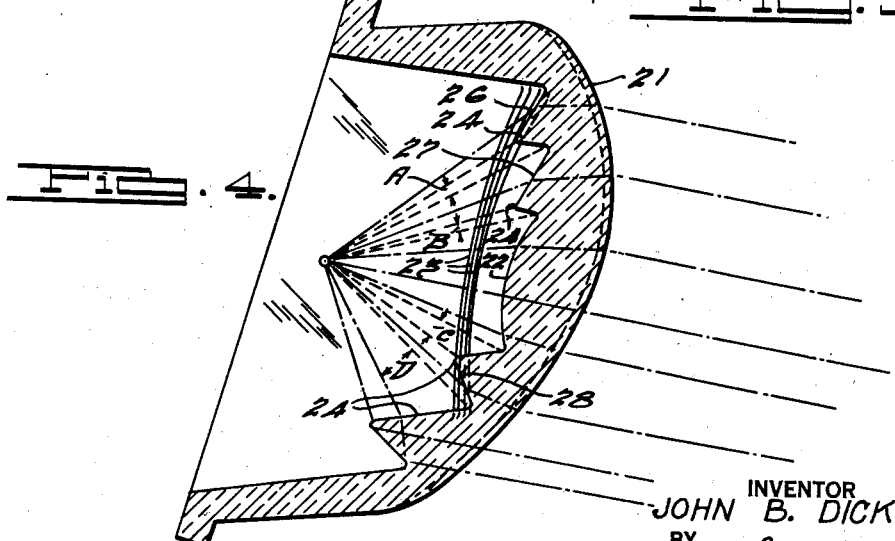
Fig. 4 is a vertical section taken substantially along line 4—4 of Fig. 2, the plane of the section being taken substantially through the focal axis of the lens.
Figure 9:
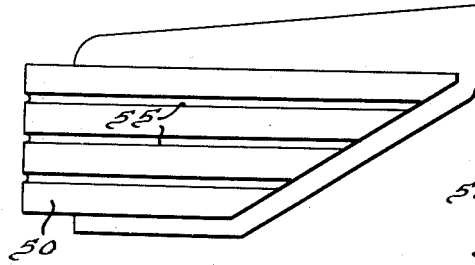
Fig. 9 is a side elevation of a further modification.

Although the present invention is particularly adapted for dioptric prism formations, such as particularly illustrated in Fig. 4, it may be seen in Fig. 3 that certain considerations, such as the relatively plane surface of the lens when viewed vertically as seen in Fig. 3, may require the formation of catadioptric prism surfaces. Thus, the ridges 23 comprise catadioptric members having sides so arranged with respect to the unalterable outer surface that the major portion of the light rays emanating from the focal point S is collected and directed forwardly in substantial parallelism with the focal axis of the central section 22. The ridges may partially shade each other in order that as much light as possible may be internally reflected as seen with respect to the rays 25. Only a very small portion of the light, such as those rays included in the angle E, is thus lost by internal dispersion.

As seen in Fig. 4 the lens when viewed in its vertical relationship presents such an irregular curve that dioptric inner surfaces are best utilized. Therefore, the ridges 24 are preferably provided with relatively large surfaces facing the focal axis of the lens, in the sense that they are in direct light receiving relation to light rays emanating from a source at the focal point S. These surfaces are mainly arranged in dioptric agreement with the outer surface 21. Thus, surfaces 26, 27 and 28 are arranged in dioptric agreement with the portion of the outer surface adjacent thereto so as to cause collimation of light rays striking the surfaces. The other side of these particular ridges presents surfaces which, for the purpose of die formation, are diverged from planes parallel to the focal axis of the lens. The angles of divergence of these surfaces are as small as possible in order that light rays falling within the angles A, B and C and lost by dispersion represent an irreducible minimum loss. As illustrated by the lowermost ridge 24 the configuration of the lens may be such that a catadioptric prism would best serve, even though the lost rays falling within the angle D may be relatively large at this particular point.

I have illustrated the lens as provided with vertical flutes 30 formed in the outer surface thereof in order to spread a small portion of the light laterally. These flutes are relatively shallow so that the outer surface of the lens remains substantially smooth in the sense that there are no deep grooves or sharp projections to prevent cleaning of the lens surface. It is to be appreciated that the lens may or may not be provided with such flutes, as desired, my invention having to do with the internal construction whereby condensation of the light rays into a beam is accomplished.

In the form of the invention illustrated in Figs. 5 to 8, inclusive, the lens body 35 comprises an outer surface 36 of substantially straight, vertical elements presenting a sharp, substantially parabolic outline in horizontal section. This lens may also be provided with horizontal flutes 37 in order to spread some light vertically. As seen in horizontal section in Fig. 7 and in vertical section in Fig. 8, the central collimating section 38 is not in the form of a simple spherical surface but comprises two curved surfaces of different centers, one at each side of the vertical axis of the lens so that the central section may form a dioptric condensing section having its inner surface arranged in agreement with the particular curve of the nose of the lens. As seen in Fig. 7, the lens is provided with a plurality of vertically extending, substantially straight and parallel ridges 39 arranged at each side of the central section, which ridges present toward the focal point relatively large surfaces 40 arranged in dioptric agreement with the unalterable outer surface. In order that the ridges may be formed by a male plunger operating along the focal axis of the lens, the sides 41, intercepting light rays within the angle F, are also of relatively large surface area but present relatively small areas projected onto a plane normal to the focal axis of the lens so that the light rays so lost by dispersion are reduced to a minimum. The ridges 39 may be provided with a central section of one curvature in crest elevation, as seen in Fig. 8, and tip portions 42 of another curvature in crest elevation so as to extend the collecting area thereof as far as possible. As also seen in Fig. 8 the lens may be provided with a horizontally extending, substantially straight ridge 43 adjacent the central section 38, there being insufficient room for more than one such ridge and, for that matter, the surface 44 above the central section 38 and the surface 45 below the ridge 43 being naturally in dioptric agreement with the surface 36. The ridge 43 presents a surface 46 of large area in dioptric agreement with the outer surface 36 and a surface 47 of as small area as possible in projection normal to the focal axis of the lens through which light falling within the angle G is dispersed.

Figure 10:
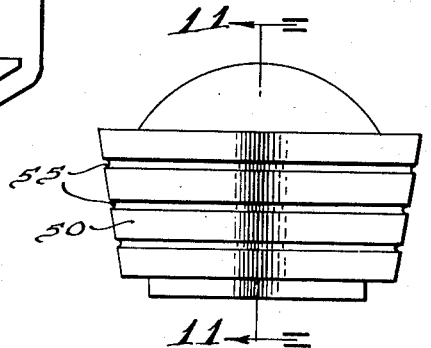
Fig. 10 is a front elevation of the modification shown in Fig. 9.
Figure 11:
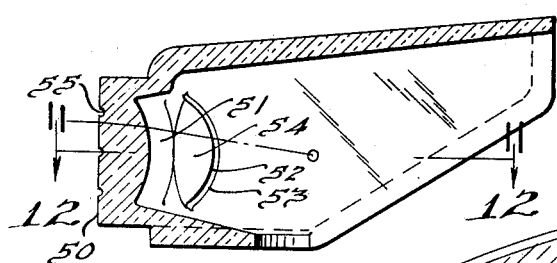
Fig. 11 is a vertical section taken through the focal axis and substantially along line 11—11 of Fig. 10.
Figure 12:
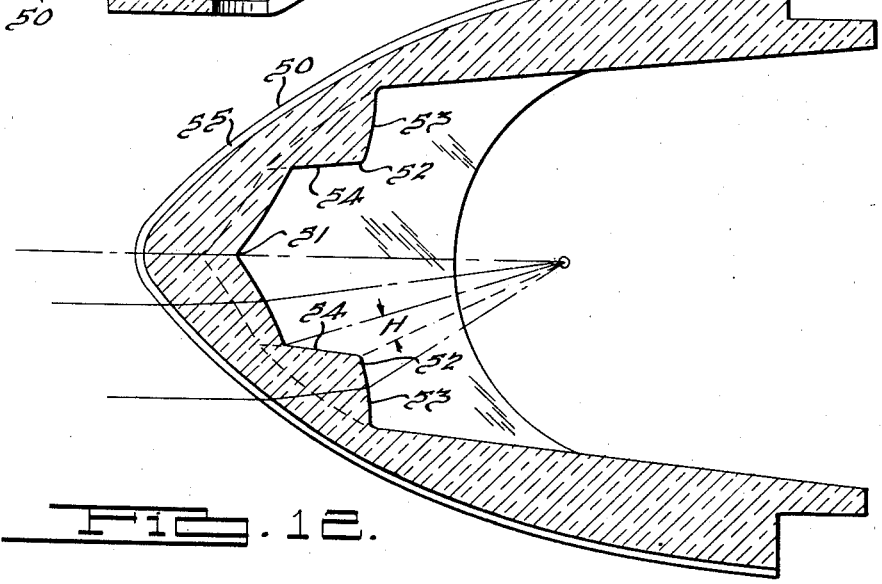
Fig. 12 is a horizontal section taken through the focal axis and substantially along the line 12—12 of Fig. 11.
Figures 13, 15:
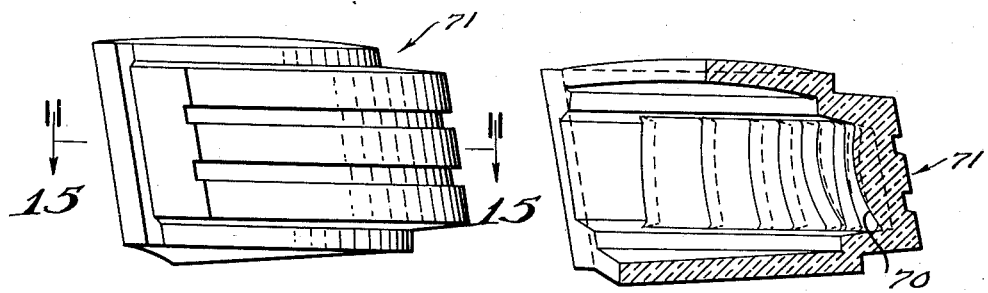
Fig. 13 is a side elevational view of a lens embodying a further development of the invention.
Fig. 15 is a horizontal section taken on line 15—15 of Fig. 13.
Figures 14, 16:
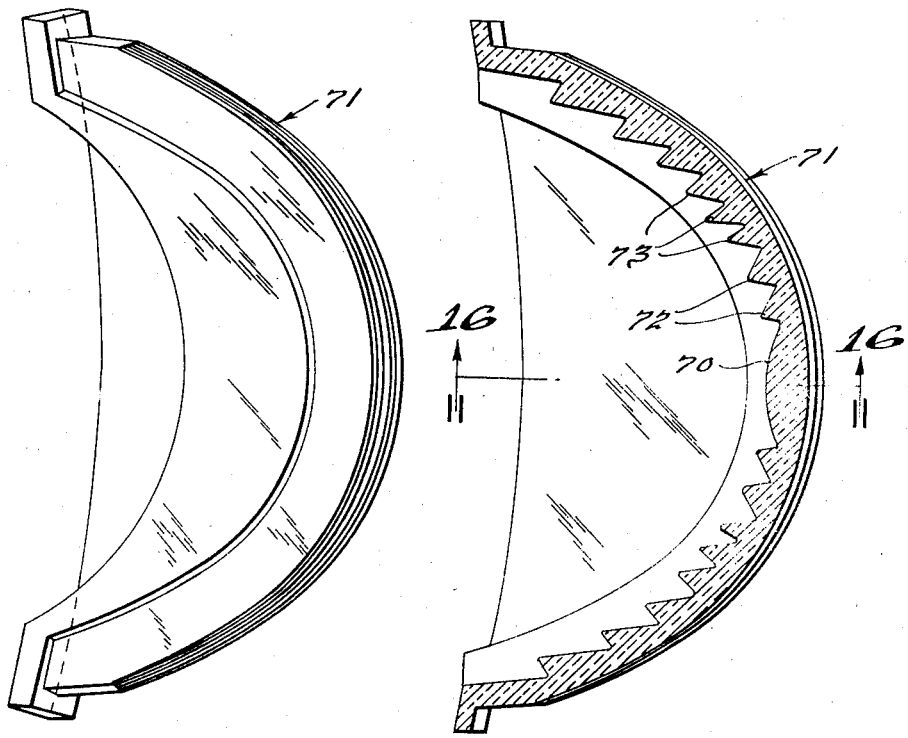
Fig. 14 is a top plan view of the lens shown in Fig. 13.
Fig. 16 is a vertical section taken on line 16—16 of Fig. 15.

In the form of the lens disclosed in Figs. 9 to 12, inclusive, the outer surface 50 is formed by substantially straight, vertical elements converging downward as seen in Fig. 10, and having a horizontal section of torpedo shape. This being a small lens, such as a directional signal light lens, there is no room for horizontal ridges above and below the central collimating section 51. The central section 51 comprises two spherical surfaces arranged at each side of the vertical axis of the lens as shown in Figs. 11 and 12. Additional efficiency is achieved by the provision of substantially straight, parallel, vertically extending ridges 52 at each side of the central section, each of which presents a large dioptric surface 53 toward the focal axis and has a surface 54 of relatively small area in projection normal to the focal axis of the lens through which light falling within the angle H is dispersed. This form of lens may also have shallow flutes 55 extending horizontally about the lens.

With the type of lens herein disclosed, the amount of light projected in a desired direction is so increased over the ordinary lens without optical configurations that it is no longer necessary to use auxiliary optical parts such as reflectors and extra lenses within the lamp, with the result that the cost of the lamp is considerably reduced without loss in light efficiency.

In the form of the invention illustrated in Figs. 13 to 16, inclusive, the lens body is provided with a central bull's-eye lens portion 70 which, as in the previously described figures, is in optical agreement with the portion of the outer lens surface 71 with which it registers. Disposed adjacent the bull's-eye lens portion 70 is a pair of substantially vertically extending ridges 72 which have surfaces arranged in dioptric agreement with those portions of the outer surface 71 with which they register. The ridges 72 are similar in construction and function to the ridges 52 of Figs. 11 and 12. Adjacent the dioptric ridges 72 is a series of ridges 73 substantially parallel thereto which have surfaces arranged in catadioptric agreement with the portions of the outer surface 71 with which they register.

With this combination of optical surfaces, it is possible to collimate light over the area of lens having a wide spread with respect to its focal point.

Having illustrated and described several modifications embodying the present invention, it should be apparent to those skilled in the art that the principles herein disclosed may be applied to any lens having an unusual configuration by varying the number and optical characteristics of the ridges and by varying the surface configurations of the central portion and the ridges to provide optical agreement thereof with the unalterable outer surface. All such modifications as come within the scope of the following claims are considered to be part of my invention.

I claim:

1. A lens comprising a body of asymmetrical shape with respect to its focal axis and having a substantially smooth outer surface of unalterable configuration dictated by aesthetic considerations, the inner surface of said body having a central area surrounding the focal axis of the lens and arranged in dioptric agreement with said outer surface to form therewith a collimating center, and a plurality of substantially straight, inwardly protruding ridges adjacent said collimating center, each of said ridges having an apex bowed inwardly of the lens body and a side face extending therefrom of substantially large area disposed in light receiving relation to the focal point of the lens and arranged in dioptric collimating agreement with said outer surface, whereby a substantially large portion of the lens collimates light about the focal axis of the lens.

2. A lens comprising a body of asymmetrical shape with respect to its focal axis and having a substantially smooth outer surface of unalterable configuration dictated by aesthetic considerations, the inner surface of said body having a central area surrounding the focal axis of the lens and arranged in dioptric agreement with said outer surface to form therewith a collimating center, and a plurality of substantially straight, inwardly protruding, parallel ridges adjacent said collimating center at the sides thereof, each of said ridges having a vertex bowed inwardly of said lens body toward the focal point thereof and a side extending therefrom of substantially large area disposed in light receiving relation to the focal point of the lens and arranged in dioptric agreement with said outer surface, whereby a substantially large portion of the lens area projected onto a plane normal to the focal axis of the lens collimates light about the focal axis of the lens.

3. A lens comprising a body of asymmetrical shape with respect to its focal axis and having a substantially smooth outer surface of unalterable configuration dictated by aesthetic considerations, the inner surface of said body having a central area surrounding the focal axis of the lens and arranged in dioptric agreement with said outer surface to form therewith a collimating center, and a plurality of substantially straight, inwardly protruding, parallel ridges adjacent said collimating center at the sides thereof, each of said ridges having a longitudinally convexed vertex and a side extending therefrom of substantially large area disposed in light receiving relation to the focal point of the lens and arranged in dioptric agreement with said outer surface, whereby a substantially large portion of the lens area projected onto a plane normal to the focal axis of the lens collimates light about the focal axis of the lens, the sides of said ridges being divergent from planes parallel to the focal axis of the lens toward said outer surface whereby said lens may be formed by dies including a male die reciprocated along the focal axis of the lens through the focal point thereof.

4. A lens comprising a body of asymmetrical shape with respect to its focal axis and having a substantially smooth outer surface of unalterable configuration dictated by aesthetic considerations, the inner surface of said body having a central area surrounding the focal axis of the lens and arranged in dioptric agreement with said outer surface to form therewith a collimating center, a plurality of substantially straight, inwardly protruding, parallel and vertical ridges adjacent said collimating center at the sides thereof, and at least one other substantially straight ridge adjacent said collimating center and running normal to said vertical ridges, each of said ridges having a longitudinally convexed vertex and a side of substantially large area disposed in light receiving relation to the focal point of the lens and arranged in dioptric agreement with said outer surface, whereby a substantially large portion of the lens area projected onto a plane normal to the focal axis of the lens collimates light about the focal axis of the lens.

5. A lens comprising a body of asymmetrical shape with respect to its focal axis and having a substantially smooth outer surface of unalterable configuration dictated by non-optical considerations, a plurality of substantially straight, inwardly protruding, parallel ridges projecting inwardly from the inner side of said lens, each of said ridges having a longitudinally convexed vertex and cooperating side faces extending therefrom of substantially large area disposed in light receiving relation to the focal point of the lens and arranged in catadioptric collimating agreement with the portions of said outer surface with which it registers respectively, whereby a substantially large portion of the lens area projected onto a plane normal to the focal axis of the lens collimates light about the focal axis of the lens, the sides of said ridges being divergent from planes parallel to the focal axis of the lens toward said outer surface whereby said lens may be formed by dies including a male die reciprocated along the focal axis of the lens through the focal point thereof.

6. A lens comprising a body of asymmetrical shape with respect to its focal axis and having a substantially smooth outer surface of unalterable configuration dictated by non-optical considerations, the inner surface of said body having a central area surrounding the focal axis of the lens and arranged in dioptric agreement with said outer surface to form therewith a collimating center, a plurality of substantially straight, inwardly protruding, parallel and vertical ridges adjacent said collimating center at the sides thereof, and a plurality of substantially straight, inwardly protruding, parallel and horizontal ridges adjacent said collimating center, each of said ridges having a vertex bowed inwardly of said lens body and a side face extending therefrom disposed in light receiving relation to the focal point of said lens and so constructed and arranged with respect to related portions of said outer surface as to direct light rays emitted from said focus through said lens in a course such that they emerge from said outer surface portions in collimated relation.

7. A lens comprising a body of asymmetrical shape with respect to its focal axis and having a substantially smooth outer surface of unalterable configuration dictated by non-optical considerations, a plurality of substantially straight and parallel ridges protruding from the inner side of said lens, each of said ridges having a longitudinally convexed vertex and a substantially conical side face extending therefrom of substantially large area disposed in light receiving relation to the focal point of the lens and so constructed and arranged in dioptric collimating agreement with respect to related portions of said outer surface as to direct light rays emanating from said focal point through said lens in a course such that they are collimated upon emerging from said portions of said surface.

8. A lens comprising a body of asymmetrical shape with respect to its focal axis having a relatively slight curvature of comparatively long radius in one dimension and a substantially greater curvature of comparatively shorter radius in a dimension normal to said first mentioned dimension, a plurality of substantially straight and parallel catadioptric collimating ridges projecting inwardly from said lens body and extending in the direction of the greater curved dimension of the latter, each of said catadioptric ridges having a vertex bowed inwardly of said lens body and optically active cooperating sides extending therefrom and disposed in light receiving relation to the focal point of said lens and so constructed and arranged in catadioptric collimating agreement with the portions of said outer surface with which they register as to direct light rays emanating from said focal point through said lens in a course such that they emerge from said outer surface portions in collimated relation, and a plurality of substantially straight and parallel dioptric collimating ridges projecting inwardly from said lens body and extending in the direction of the less curved dimension of the latter, each of said dioptric ridges having a vertex bowed inwardly of said lens body and an optically active side face extending therefrom and disposed in light receiving relation with the focal point of said lens and so constructed and arranged in dioptric collimating agreement with the portions of the outer surface with which it registers as to direct light rays emanating from said focal point through said lens in a course such that they emerge from said outer surface portions in collimated relation.

9. A lens comprising a body of asymmetrical shape with respect to its focal axis and having a substantially smooth outer surface of unalterable configuration dictated by non-optical considerations, the inner surface of said body having a central area surrounding the focal axis of the lens and arranged in dioptric agreement with a portion of said outer surface with which it registers to form therewith a collimating center, a pair of substantially straight, inwardly protruding, parallel ridges, one on each side of said collimating center and each projecting inwardly from the inner side of said lens, each of said ridges having a longitudinally convexed vertex and cooperating side faces extending therefrom of substantially large area disposed in light receiving relation to the focal point of said lens and arranged in catadioptric collimating agreement with the portions of said outer surface with which it registers respectively, whereby a substantially large portion of the lens area projected onto a plane normal to the focal axis of the lens collimates light about the focal axis of the lens.

JOHN B. DICKSON.